United States Patent [19]
Raehse et al.

[11] Patent Number: 5,544,427
[45] Date of Patent: Aug. 13, 1996

[54] PROCESS FOR THE PRODUCTION OF GRANULES SUITABLE AS WETTING AGENTS, DETERGENTS AND/OR CLEANING PRODUCTS

[75] Inventors: Wilfried Raehse; Wilhelm Beck, both of Duesseldorf; Dieter Jung, Hilden; Dieter Sonnemann, Dueselldorf, all of Germany

[73] Assignee: Henkel Kommanditgesellschaft auf Aktien, Duesseldorf, Germany

[21] Appl. No.: 284,694

[22] PCT Filed: Feb. 4, 1993

[86] PCT No.: PCT/EP93/00265

§ 371 Date: Aug. 12, 1994

§ 102(e) Date: Aug. 12, 1994

[87] PCT Pub. No.: WO93/15812

PCT Pub. Date: Aug. 19, 1993

[30] Foreign Application Priority Data

| Feb. 12, 1992 | [DE] | Germany | 42 04 090.6 |
| Feb. 12, 1992 | [DE] | Germany | 42 04 035.3 |
| Feb. 27, 1992 | [DE] | Germany | 42 06 050.8 |
| Mar. 2, 1992 | [DE] | Germany | 42 06 495.3 |

[51] Int. Cl.$^6$ ............................................. F26B 3/08
[52] U.S. Cl. .................... 34/372; 34/375; 34/360; 34/467; 34/468
[58] Field of Search ...................... 34/372, 375, 360, 34/467, 468

[56] References Cited

U.S. PATENT DOCUMENTS

| 2,154,000 | 4/1939 | Zizinia et al. | 34/372 |
| 3,339,286 | 9/1967 | Stephanoff | 34/372 |
| 3,621,585 | 11/1971 | Robertson | 34/375 |
| 4,741,803 | 5/1988 | Loeffelmann | 159/4.04 |

FOREIGN PATENT DOCUMENTS

1206980  8/1989  Japan.

OTHER PUBLICATIONS

Trommelen et al; "Evaporation and Drying of Drops in Superheated Vapors", Aiche, Journal 16.
Beeby et al; "Steam Drying", Plenary Lecture, 1984.
Stein; "Berechnung der Verdampfung von Fleussigkeit aus feuchten Produkten im Soreygtyrn".

Primary Examiner—Henry A. Bennett
Assistant Examiner—Siddharth Ohri
Attorney, Agent, or Firm—Ernest G. Szoke; Wayne C. Jaeschke; Real J. Grandmaison

[57] ABSTRACT

A process for the production of pourable and free flowing granules of materials or mixtures thereof which are suitable for use as wetting agents, detergents or cleaning products wherein an aqueous solution or suspension of the wetting agents, detergents or cleaning products is dried using a hot gas stream of superheated steam. Drying is terminated before the granules are damaged by heat, and the hot gas stream is freed from entrained particles of the materials by means of filters.

11 Claims, 1 Drawing Sheet

PROCESS FOR THE PRODUCTION OF GRANULES SUITABLE AS WETTING AGENTS, DETERGENTS AND/OR CLEANING PRODUCTS

BACKGROUND OF THE INVENTION

1. Field of the Invention

This invention relates to a process for the production, more particularly the continuous production, of pourable and free flowing granules of useful materials or mixtures of useful materials, which are suitable for use as and/or in wetting agents, detergents and/or cleaning products, from aqueous solutions and/or suspensions by spray drying or fluidized bed spray granulation or the like in a drying vessel using a hot gas stream. The process according to the invention involves one or more drying steps, superheated steam being used as the drying gas.

The spray drying of aqueous preparations of useful materials of the type mentioned, which are widely used, for example, as laundry detergents, has been carried out on an industrial scale for decades. Hot air or mixtures of air and hot waste combustion gases are used as the drying gas stream. Washing powders or useful materials and/or mixtures of useful materials for the production of laundry detergents in pourable and free-flowing powder form are produced in corresponding spray drying towers, generally at ambient pressure, either in co-current or more often in countercurrent.

In their application DE-A 40 30 688, applicants describe a process for the production of solid, fine-particle pourable and free-flowing useful materials or mixtures thereof for wetting agents, detergents and/or cleaning products from aqueous preparations thereof, superheated steam being used as the drying hot gas stream and drying of the particulate material being terminated before it is endangered by heat. If necessary, the long-term pourability and free-flow of the material thus partly dried is ensured by addition of mixture constituents which are capable of binding limited quantities of water. In addition to or instead of this measure, the particulate material may also be aftertreated to homogenize its residual moisture content and/or after-dried under conditions which do not affect the useful material. The teaching of the invention described hereinafter is concerned with a specific embodiment of this process according to the earlier application cited above. The teaching according to the invention seeks to enable high-quality useful materials or mixtures of useful materials of the type in question to be obtained where superheated steam is used as the drying gas. The problem addressed by the present invention will become clear from the following considerations presented purely by way of example:

The requirements which high-quality detergents, particularly laundry detergents, are now having to satisfy in practice are not confined to performance expectations. The visual appearance, for example a light color in the case of laundry detergents, and other physical properties, such as free flow, a high apparent density, rapid dissolution in water and good dispensing properties and the like, are also important requirements.

The problem addressed by the present invention was to provide optimized conditions for the application in question of drying useful materials with superheated steam as drying medium to enable the high-quality useful materials or mixtures of useful materials to be obtained in the dry state.

It is important in this connection to bear in mind the fact that practical experience in the application of drying processes using superheated steam as the drying gas has been very limited up till now although, basically, this technology has been known since the beginning of this century and has been repeatedly described in the literature. Earlier application DE-A 40 30 688 deals in detail with the relevant prior-art literature. Reference is made here to the corresponding observations in the earlier application and solely to the following publications which in turn cite numerous publications on this subject: A.M. Trommelen et al. "Evaporation and Drying of Drops in Super-heated Vapors" AIChE Journal 16 (1970) 857–867; Colin Beeby et al. "STEAM DRYING" Plenary Lecture, Pro. 4th Int. Drying Sym. Kyoto (eds. R. Toei and Arun S. Mujumdar) 1984, Vol. 1, 51–68 and W. A. Stein "Berechnung der Verdampfung von Flu üssigkeit aus feuchten Produkten im Sprühturm (Calculating the Evaporation of Liquid from Moist Products in spray Drying Towers)", Verfahrenstechnik 7 (1973), 262–267.

Accordingly, the present invention relates to the solution to the problem stated above of obtaining high-quality useful materials or mixtures of useful materials which are suitable for use as and/or in wetting agents, detergents and/or cleaning products. More particularly, the present invention relates to a process for drying these water-containing valuable materials or mixtures of valuable materials, which may even be present as aqueous preparations, using superheated steam as the drying gas which is recycled to the drying stage after removal of the evaporated water.

Where superheated steam is used as the drying gas, the dust present in the recycled gas has to be removed to safeguard the operation of the circulation fan and the superheater and to avoid deposits in the pipes. This applies in particular to a granulation process which includes spraying because the fine dust formed would lead to abrasion of the equipment arranged in the drying gas circuit.

Where drying is carried out with circulated super-heated steam, it is standard practice to remove the dust in cyclones (Drying 1980 (Volume I)—Developments in Drying, pages 320 to 331, more particularly FIG. 2, Hemisphere Publishing Corporation, New York (1980) and Gehrmann, Chem.-Ing.-Techn. 62 (1990) No. 10, pages A 512—A 520, more particularly FIG. 5). Where the materials to be dried are inorganic, the removal of dust in such cyclones is sufficient. However, where the material to be dried is organic, the filter dust present in the hot steam recycle gas tends to cake on the steam blower, the heat exchanger, the pipes and on other equipment. In this case, the cleaning effect of a cyclone is no longer sufficient.

2. Description of the Invention

According to the invention, therefore, the circulating steam is freed from entrained particles of the starting materials by means of filters consisting of woven fabrics and/or felts, preferably needle felt, more particularly tubular filters. In contrast to cleaning with cyclones, the dust content of the recycle gas can be reduced with filters to a value of 10 mg m$^3$ and preferably to a value of 5 mg m$^3$.

Where superheated steam is used as the drying gas, it cools down on flowing past the moist particles so that there is an increase in its water content. If the drying gas then flows through the filter, there is a danger of water condensing on the filter cloth or felt and in the clean gas zone which must definitely be avoided. For this reason, it is of advantage if the filters and/or the clean gas zone are additionally heated. The filter may be heated, for example, by a tube coil on the inner wall of the filter housing or by a heatable double jacket.

Where superheated steam is used as recycle gas for drying, filters have not hitherto been used for the removal of dust. On the one hand, drying with superheated steam necessitates higher temperatures at the dryer exit at which the filter material must not decompose. On the other hand, there is a danger of the filter medium hydrolyzing in the steam atmosphere. For these reasons among others, drying with superheated steam has hitherto been applied to materials also which do not form large amounts of dust so that cyclones are sufficient for dust removal. According to the invention, however, the filters used for removing dust from the drying gas must be resistant to hydrolysis, even at the high temperatures prevailing in the steam atmosphere, and must be temperature-resistant at the high exit temperatures of the drying gas.

To ensure that cleaning of the filters does not interfere with the drying process, the circulating steam is allowed to flow inwards through the tube filters which are exposed to surges of pressurized gas from inside, more particularly periodically, so that any particles of the starting material which have settled on the filters are removed. The brief surges of pressurized gas produce a pressure wave which travels over the entire surface of the tube. As a result, the filter tubes are stretched and the adhering fine dust is ejected downwards. In one advantageous embodiment, the cleaning sequence can be automatically controlled. To ensure that the steam atmosphere is not contaminated by foreign gases, for example air, and that inert conditions are maintained, superheated steam is advantageously used as the pressurized gas for cleaning the filters. Another advantage in this case is that the filter material does not have to be oxidation-resistant although an inert atmosphere is otherwise maintained.

Separate filter housings and additional units for discharging the filter dust from the housings are not necessary if the steam is made to circulate upwards in countercurrent to the material being dried and through the filters arranged in the upper part of the drying vessel. The fine dust removed accumulates directly in the drying vessel. In a particularly preferred embodiment, the steam is guided through filters arranged vertically above the spraying zone or the fluidized bed. In this case, the fine dust removed from the filter elements drops back into the spraying zone or the fluidized bed where it agglomerates with the other particles.

Another reason why the filter tubes are cleaned with steam is to rule out the danger of dust explosions. Product quality is also increased if oxygen is prevented from entering the recycle gas during the cleaning process.

In other embodiments, the invention relates to the use of this process for obtaining free-flowing surfactant solids, more particularly from the field of anionic surfactants based on natural materials, and also to its use for obtaining dried silicate-base useful materials which may be used in particular in laundry detergents and, finally, to the use of the described process for obtaining so-called laundry detergent tower powders to which temperature-sensitive and/or steam-volatile components may be subsequently added for the production of, or to complete the formulation of, the laundry detergents.

The technical teaching with which the present disclosure is concerned is a further development of earlier application DE-A 40 30 688 which has already been repeatedly cited. In the interests of completeness of disclosure of the present invention, the disclosure of that earlier application is hereby also specifically included as part of the disclosure of the present invention. In addition, the following process elements are important:

Under the working conditions according to the invention, drying with the superheated steam may also be carried out on the one hand as spray drying and/or on the other hand as fluidized bed drying. Starting materials of comparatively high water content are present, for example, as flowable and sprayable aqueous solutions, emulsions and/or suspensions of the useful materials or mixtures of useful materials to be dried. In one important embodiment, starting materials of this type are subjected to spray drying technology known per se. The spray drying process may be carried out in co-current or in countercurrent in correspondingly equipped spray drying towers. In general, the countercurrent principle is also preferably applied in the process according to the invention. If, on the other hand, the drying principle according to the invention is used in fluidized bed drying, the known working principles of possible particle enlargement may be applied in this case, too.

In general, the process according to the invention is carried out at normal pressure although the invention specifically includes moderate excess or reduced pressures.

In other respects, the process according to the invention may largely be carried out in accordance with applicants' earlier patent application cited at the beginning for drying the mixtures of useful materials in question with superheated steam as the drying gas. To complete the disclosure of the invention, the relevant passages of that earlier application are reproduced herein where necessary:

In the earlier application, the fact that optimal drying results by the action of hot steam in the end product of the process are not essential is regarded as crucial to understanding the teaching of the drying of mixtures of useful materials of the type in question with superheated steam. Basically, the same also applies to the teaching according to the invention. However, it has been found that, providing such troublesome factors as air or oxygen are reliably ruled out, even mixtures which, under conventional drying conditions with hot gases, tended to enter relatively quickly into unwanted reactions, for example discoloration, encrustation and the like, are comparatively immune to temperature. For drying with superheated steam, this means that safe operation both with superheated steam at comparatively high temperatures and degrees of drying to minimal residual moisture contents are possible without any adverse effect on the quality of the end product. Thus, residual moisture contents distinctly below 1% by weight, for example down to about 0.5% by weight or even lower, can be established in the dry material. At the same time, working temperatures of the used steam issuing from the drying zone above 100° to 110° C., preferably above 150° C. and, more preferably, above 180° C. can be applied.

Nevertheless, even fairly significant residual moisture contents can be tolerated providing the composition of the material ensures that the residual water is bound by a form of "internal drying" to such an extent that the long-term pourability and free flow of the dry material is guaranteed.

As described in the earlier application, the teaching of the invention also provides for after-treatment of the partly dried granules initially obtained in addition to or instead of this auxiliary measure. The aftertreatment may be carried out by two methods which may even be combined with one another.

The first of these methods is based on the fact that the individual degree of drying of the particular particle in question is determined by its particle size. If, in accordance with the invention, the drying process is terminated at a time when considerable quantities of residual moisture are still present in the material, integral consideration of the residual moisture content does only partial justice to reality. By differential consideration of the distribution of this residual moisture over the individual fractions of material, it has been found that the fine or ultrafine fractions can be dried very extensively or completely while the coarser fractions still contain such considerable quantities of moisture that the material removed from the spray drying zone is not guaranteed long-term pourability and free flow. In one important embodiment of the process according to the invention, therefore, "after-drying" of the primary material from the spray drying zone is achieved by an additional treatment step which—without exposing the powder-form material to the risk of developing tackiness—leads to homogenization of the moisture content over the material as a whole irrespective of the individual particle size. In this way, so much residual moisture can be introduced into the fine and ultrafine material from the still comparatively moist coarse particles of the material that, after this homogenization step, the long-term pourability and free flow of the dried material are guaranteed without further quantities of moisture having to be additionally eliminated from the bulk material.

This aftertreatment step may be carried out by any method which equalizes the moisture content of the individual particles and, at the same time, prevents them from adhering to one another. Circulation or shaking of the material initially obtained either continuously or discontinuously are mentioned as examples of such methods. Aftertreatment of the material in a fluidized bed having a very much higher solids density by comparison with spray drying can be particularly suitable. Any gases, for example quite simply ambient air, may be used for this purpose. Damage to the material by oxidation and/or unwanted contamination of the waste air is minimal or nonexistent and is easy to control. Since the material to be dried is removed from the spray drying zone at elevated temperature, typically of the order of 100° C., a further slight reduction in the residual moisture content can be obtained by this subsequent homogenization of moisture in a fluidized bed, for example using ambient air.

However, in addition to or instead of this auxiliary measure, provision can also be made in the process according to the invention for a further reduction in the residual moisture content by additional drying. If after-drying proves to be desirable, one such additional after-drying step will generally be sufficient. However, after-drying in a sequence of several steps is not ruled out by the teaching of the invention. The after-drying step(s) is characterized in that it is carried out under conditions which do not significantly endanger the useful materials in the material to be dried. In principle, several process parameters are available for reducing that risk, including for example reducing the temperature of the hot gas phase, dispensing with superheated steam as the hot gas and replacing it with drying gases of different origin, for example air and/or inert gas, and changing over to another drying technology.

In one preferred embodiment of the process according to the invention, the solids density of the material to be dried in the hot gas stream is substantially increased where such an after-drying step is used, so that, in this after drying step, the process principles of fluidized bed drying follow spray drying from the first drying stage. This subsequent fluidized bed drying step may in turn be carried out with any drying gases. In the preferred embodiment of the invention, superheated steam is used as the hot gas in this step also. However, the intensive exchange of heat between the now comparatively closely packed solid particles can thus effectively counteract unwanted overheating of the material to be dried and, more particularly, the danger of overheating of the fine particles of that material. In preferred embodiments of the invention, it is again possible through the composition of the material to be dried to ensure that the elements of the "internal drying" discussed above can be used to bind any residual moisture still present.

Aqueous preparations of useful materials and combinations thereof from the field of wetting agents, detergents and/or cleaning products which are not damaged significantly if at all, by brief exposure to water or steam at a material temperature of 100° to 110° C. are particularly suitable for use in the process according to the invention. Components of this type which are not damaged by exposure to temperatures in the range mentioned for at least about 0.5 to 1 min. under the working conditions are particularly suitable useful materials. By controlling the process parameters—in addition to the design of the spray-drying zone, the working temperature range used in accordance with the invention and the droplet or particle size of the sprayed material are mentioned by way of example—it is possible to select residence times of a matter of seconds for the particular particles under the conditions of the superheated steam. It is crucial that the period of exposure to temperatures in this range can be kept so short in the process according to the invention that no substantial damage to the material to be dried occurs under the working conditions selected. For example, even surfactant compounds which are basically vulnerable to hydrolysis are largely undamaged by exposure to these working conditions for a few minutes. Thus, aqueous preparations of water-soluble and/or insoluble organic and/or inorganic useful materials from wetting agents, detergents and/or cleaning products which may be assigned, for example, to the following classes may be subjected to drying in the drying process according to the invention: surfactant or emulsifier components, inorganic and/or organic builders or builder components, washing alkalis, fillers or neutral salts, fabric softeners, bleach activators, auxiliaries for improving the soil suspending power of the liquors, such as redeposition inhibitors or even abrasives.

If it is necessary to retain considerable quantities of water in the product subjected to the main drying process and hence to bind this residual water to ensure the long-term pourability and free flow of the dried material, auxiliaries capable of fixing water, preferably in the form of particulate solids, are used in accordance with the invention. In this case, residual water may be fixed, for example, by binding as water of crystallization. However, limited quantities of water in solid particles of the type in question here can also be bound purely by absorption without causing any unwanted tackiness or adhesion of the particles to one another. The auxiliaries are at least used in quantities sufficient to guarantee pourability and stability in storage despite the residual moisture present in the material.

In one embodiment of the invention, the auxiliaries used to bind the residual water may be added to the dried fresh material, best immediately after it has been removed from the process, and intensively mixed therewith. In preferred embodiments, however, the auxiliaries binding the residual water are at least partly, preferably at least predominantly or, in general, completely added to the aqueous preparations of useful material before they are dried. This particular embodiment may always be applied when the particular temperature sensitivity of the material to be dried allows drying to be carried out to such an extent that the residual moisture remaining in the product can be adequately absorbed and bound by the auxiliaries used.

In one embodiment of the process according to the invention of particular advantage in this regard, corresponding useful materials from the field of wetting agents, detergents and/or cleaning products which themselves are sufficiently immune to temperature are used as the auxiliaries capable of binding residual water. Typical examples of such materials are inorganic materials capable of binding water of crystallization from the classes of builder components, washing alkalis and/or so-called fillers. Typical examples of the subclasses of useful materials listed here are silicate compounds capable of binding water of crystallization, more particularly from the class of zeolites. One example particularly characteristic of laundry detergents is detergent-quality zeolite NaA which has a calcium binding power of 100 to 200 mg CaO/g cf. DE 24 12 837). Typical examples of washing alkalis which bind water of crystallization are soda or sodium bicarbonate while sodium sulfate as neutral salt or filler has a pronounced capacity for binding considerable quantities of water of crystallization. However, in addition to or instead of the above-mentioned auxiliaries capable of binding water of crystallization, the residual water may also be bound by auxiliaries or corresponding useful materials capable of binding water by absorption. Thus, it is known that known starch- or cellulose-based redeposition inhibitors, fabric softeners, particularly those based on inorganic swellable silicates, and also a number of organic surfactant compounds which are solid under normal conditions are capable of absorbing considerable quantities of water without reacting by developing unwanted surface tackiness.

Depending on the temperature sensitivity of the useful materials or mixtures of useful materials used on the one hand and the nature and quantity of the auxiliaries used on the other hand, considerable residual water contents may remain in the dried material without endangering its long-term pourability and free flow. According to the invention, therefore, drying with superheated steam is terminated at residual water contents of the materials removed from the spray drying zone in the range from about 0.5 to 20% by weight, residual water contents in the range from about 5 to 12% by weight being preferred. The % by weight ranges mentioned relate to the weight of the fine-particle material removed from the steam zone. In another preferred embodiment of the invention, however, the amount of residual water which is not bound as water of crystallization is limited. Thus, it can be useful to limit this water content to at most about 10% by weight, preferably to no more than about 5 to 7% by weight and better still to values of at most about 1 to 3% by weight. Once again, the foregoing observations apply to the percentages by weight. Taking into account specialist knowledge of the field in question, the combination of desired properties is thus reliably achieved using superheated steam at high working temperatures: adequate drying at moderate temperatures, termination of the drying reaction even when considerable quantities of residual moisture are still present in the material, so that unwanted temperature effects are ruled out, and establishing long-term pourability and free flow in accordance with practical requirements.

As already mentioned, the process according to the invention offers additional possibilities for establishing the particular residual moisture content required which may be applied in addition to or instead of the principles of inner drying discussed in the foregoing. These alternative possibilities include the homogenization and/or step-by-step reduction of the moisture content of the material to be dried, the spray drying step being followed by one or more after drying steps which discharge troublesome quantities of moisture under comparatively moderate working conditions.

Basically, any of the after drying techniques known to the expert in direct or indirect contact with hot gases are suitable for this purpose. In the preferred alternative of the process according to the invention, superheated steam is also used for after drying, best in an additional step. In order not to endanger the temperature-sensitive material, the temperature at which the superheated steam is used may be lower than in the spray drying stage. However, the following alternative has proved to be particularly successful:

The fine-particle material which still has an excessively high moisture content is removed from the spray drying zone and transferred to a following fluidized bed drying stage. Partial agglomeration of the still sufficiently moist material from the spray drying zone into a relatively coarse agglomerate is entirely acceptable or may even be desirable in a preferred embodiment of the teaching according to the invention. A partial agglomeration step may be used in particular to bind the fine component of the material removed from the spray drying zone and to combine it, for example, with the more moist coarse particles of the primary drying product. The following fluidized bed drying stage is carried out in known manner with the greatly increased solid densities in the drying zone which lead to the intensive exchange of heat between all the solid particles of the fluidized bed and, in this way, prevent unwanted increases in temperature in part of the granular material to be dried, even when steam which has been heated to comparatively high temperatures is again used as the drying gas.

In the after drying stage in the fluidized bed, limited quantities of residual moisture merely have to be removed to ensure the long-term free flow of the granular material, so that the residence time of the material in this fluidized bed aftertreatment can also be kept short, amounting for example to only a few minutes. Main drying in the spray drying zone and after drying in the fluidized bed may be carried out together in a continuous process or may even be carried out independently of one another as separate process steps. General specialist knowledge may be used in this regard.

In the second drying stage, the residual moisture still present may be partly or substantially completely removed. In practical embodiments, at least about 10 to 80% and preferably about 20 to 70% (based on the residual moisture) of the residual moisture present in the material removed from the spray drying zone is removed where this modification of the process is applied. Traces of moisture remaining in the material are rendered harmless by the internal drying.

In one important embodiment, the process according to the invention is used to dry mixtures of useful materials for the production of laundry detergents. The aqueous starting materials to be dried preferably contain washing-active surfactants together with builders and, optionally, washing alkalis and/or neutral salts. At least part of the multicomponent mixtures used is capable of binding and/or fixing residual water, more particularly in the form of water of crystallization. As in the spray drying of laundry detergents, the laundry detergent component of mixtures of the type in question is generally not exposed in its entirety to fluidized-bed spray granulation. This is precluded by the extreme temperature sensitivity of peroxide-containing bleach components, such as perborate monohydrate or tetrahydrate, and corresponding other particularly temperature-sensitive components. Enzymes, fragrances, bleach activators and other minor components are mentioned as further examples. Accordingly, the teaching of the present invention also provides inter alia for the production of so-called multicomponent tower powders which contain a large part of the components making up the final detergent in admixture with one another, but which are subsequently treated or mixed with other, liquid and/or solid active components. Known examples of such liquid components are, in particular, readily volatile nonionic surfactant components which, although no longer discharged into the environment with the waste gas in the process according to the invention, can nevertheless readily be added to the detergent as a whole by subsequent spraying onto absorbent tower powder which has been prepared in accordance with the invention.

The working conditions of the process according to the invention enable high temperatures to be used for the circulated steam phase in the drying step of the spray drying process. The working temperatures after superheating (reheating) are generally above 150° C. and preferably at least about 200° C. in the gas phase. Working temperatures of 250° C. and higher can be particularly interesting and even temperatures of at least 300° C. and more particularly in the range from 300° to 380° C. may be applied. In many cases, working temperatures in the range from about 270° to 350° C. in the steam phase are particularly suitable. All these temperature values relate to the temperature of the steam heated to optimal temperature which is delivered to the spray drying zone in co-current or countercurrent. The temperature of the steam falls in known manner during its contact with the wet or moist material. Considerations based largely on energy factors, including in particular the intended subsequent use of the steam to be removed from the circuit, determine the quantitative ratios between the quantity of water to be evaporated and the quantity of superheated steam delivered. Embodiments which provide only for a limited reduction in the steam temperature after leaving the spray drying zone to values in the range from about 190° to 250° C. are possible in this regard whereas, in other embodiments, the thermal energy of the steam can advantageously be further utilized to reduce the temperature of the steam to the vicinity of the condensation temperature under process conditions. More specifically, these details are determined inter alia by the design of the recycle process as a whole. Corresponding considerations apply to the use of superheated steam as the hot gas in an optional after-drying stage in the fluidized bed process. The figures mentioned above apply in this case also.

Basically, it may be said in respect of these considerations that the process is carried out in a closed-loop system with a steam circuit from which the water evaporated from the starting material is removed while the energy released in particular during the drying step is directly returned to the circuit. In one important embodiment, the steam removed is freed from entrained particles of material and put to another use as process steam, if desired after its pressure and temperature have been adapted to the required conditions. In another embodiment of the process according to the invention, the steam removed is at least partly condensed and freed from entrained particles of material. The liquid phase accumulating may be recycled to the drying process together with any of the useful material present therein. In this connection, it is possible, for example, to use vaporous fractions of the gas stream removed from the circuit to concentrate the aqueous liquid phase. The liquid recycled together with the useful material present therein may be directly delivered to the spray drying zone or may first be mixed with the fresh aqueous preparations and introduced in this form into the spray drying zone for drying.

In one particularly interesting embodiment of the invention, the heat of condensation of the steam removed from the circuit is recovered and utilized. By adopting suitable measures, it is even possible to recycle the small amounts of useful material which have left the primary steam circuit via the superheated steam removed therefrom. To this end, the following procedure, for example, may be adopted using the heat of condensation of the steam removed from the circuit:

Using the heat of condensation of the predominantly steam-containing mixed gas stream removed from the circuit, the steam condensate is concentrated in a preferably multiple-stage evaporation unit. The residual concentrate accumulating is returned to the primary process circuit. More particularly, this residual concentrate may be added to the slurry of useful material to be dried by superheated steam.

If necessary, the non-condensable residual gas phase, if any, accumulating during condensation of the superheated steam removed from the primary circuit (i.e. the non-condensable constituents, if any, present from the combustion gases used for heating, more particularly nitrogen and/or carbon dioxide where the steam is directly heated with hot waste gases) may be subjected to further working up during the condensation process. These gases may thus be freed from entrained residues of the material being dried. The additional working up may comprise such treatment steps as incineration or treatment in biofilters and/or in washing units. By this combination of substantially complete recycling of the particular steam-based streams and the reliable destruction of final residual traces in the comparatively limited quantities of non-condensable gases, the process according to the invention makes it possible for the first time in the industrial field with which the invention is concerned to recover useful materials and mixtures of useful materials from the field of detergents and cleaning products substantially or at least very largely free from waste air and free from polluted wastewater.

Irrespective of this and in addition to these considerations, the method according to the invention provides for appreciable savings of energy by comparison with conventional hot gas drying. Thus, through the circulation of steam at a comparatively high temperature level, the amount of heat to be introduced in the recycle process per kilogram of water to be evaporated is considerably reduced by comparison with conventional drying processes involving only a single passage of the hot drying gases. In addition to the absence of pollutants, therefore, the process according to the invention satisfies further requirements of modern technology for processes carried out on an industrial scale.

General particulars of useful materials for direct or indirect use in the production of wetting agents, detergents and/or cleaning products using the principles according to the invention are given in the following with reference to typical components of modern laundry detergents.

Suitable anionic surfactants are, for example, soaps of natural or synthetic, preferably saturated, fatty acids. Soap mixtures derived from natural fatty acids, for example coconut oil fatty acid, palm kernel oil fatty acid or tallow fatty acid, are particularly suitable. Soap mixtures of 50 to 100% saturated $C_{12-18}$ fatty acid soaps and 0 to 50% oleic acid soap are preferred.

Other suitable synthetic anionic surfactants are those of the sulfonate and sulfate type. The process according to the invention can have particular significance for corresponding compounds of vegetable and/or animal origin.

Suitable surfactants of the sulfonate type are alkylbenzene sulfonates ($C_{9-15}$ alkyl), olefin sulfonates, i.e. mixtures of alkene and hydroxyalkane sulfonates, and sulfonates of the type obtained, for example, from $C_{12-18}$ monolefins with a terminal or internal double bond by sulfonation with gaseous sulfur trioxide and subsequent alkaline or acidic hydrolysis of the sulfonation products. Also suitable are the alkane sulfonates obtainable from $C_{12-18}$ alkanes by sulfochlorination or sulfoxidation and subsequent hydrolysis or neutralization or by addition of bisulfites onto olefins and, more particularly, the esters of α-sulfofatty acids (ester sulfonates), for example the α-sulfonated methyl esters of hydrogenated coconut oil, palm kernel oil or tallow fatty acids.

Other important surfactant and emulsifier components in this regard are the so-called disalts which may be obtained by saponification of the above-mentioned α-sulfonated fatty acid methyl esters or by direct sulfonation of fatty acids, more particularly saturated $C_{12-18}$ fatty acids. The process according to the invention thus makes it possible for the first time for surfactants of the type described here and in the following based on natural materials to be made available without difficulty on an industrial scale in the form of dry free-flowing concentrates which have virtually unlimited storage life and hence make a significant contribution to the universally desired replacement of ABS.

Suitable surfactants of the sulfate type are the sulfuric acid monoesters of primary alcohols of natural and synthetic origin, i.e. of fatty alcohols, for example coconut oil fatty alcohols, tallow fatty alcohols, oleyl alcohol, lauryl, myristyl, palmityl or stearyl alcohol, or the $C_{10-20}$ oxoalcohols and those of secondary alcohols having the same chain length. Sulfuric acid monoesters of the alcohols of natural and/or synthetic origin ethoxylated in particular with 1 to 6 mol ethylene oxide are also suitable components. Such compounds as 2-methyl-branched $C_{9-11}$ alcohols containing on average 3.5 mol ethylene oxide are mentioned as an example of synthetic alcohol. Sulfated fatty acid monoglycerides are also suitable.

The anionic surfactants may be present in the form of their sodium, potassium and ammonium salts and also as soluble salts of organic bases.

Suitable nonionic surfactants are adducts of 1 to 40 mol and preferably 2 to 20 mol ethylene oxide with 1 mol of an aliphatic compound essentially containing 10 to 20 carbon atoms from the group consisting of alcohols, carboxylic acids, fatty amines, carboxylic acid amides or alkane sulfonamides. Of particular importance are the adducts of 8 to 20 mol ethylene oxide with primary alcohols, for example with coconut oil or tallow fatty alcohols, with oleyl alcohol, with oxoalcohols or with secondary alcohols containing 8 to 18 and preferably 12 to 18 carbon atoms. In addition to the water-soluble nonionics, however, water-insoluble or substantially water-insoluble polyglycol ethers containing 2 to 7 ethylene glycol ether units in the molecule are also of interest, particularly when they are used together with water-soluble nonionic or anionic surfactants. It has already been pointed out that, in the process according to the invention, the tendency of nonionic surfactants such as these to be carried over can be taken into consideration by completely or partly applying components of this type to a correspondingly preformed tower powder on completion of spray drying. The same also applies in particular to nonionic surfactants liquid at room temperature.

Other suitable nonionic surfactants are alkyl glycosides corresponding to the general formula R—O—(G)$_x$, in which R is a primary linear or branched aliphatic radical containing 8 to 22 and preferably 12 to 18 carbon atoms, G stands for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Suitable and, in particular, ecologically safe builders are finely crystalline synthetic zeolites of the type already mentioned. Other builder components which, in particular, may be used together with the zeolites include (co)polymeric polycarboxylates, such as polyacrylates, polymethacrylates and, in particular, copolymers of acrylic acid with maleic acid, preferably those with 50% to 10% maleic acid. The molecular weight of the homopolymers is generally in the range from 1,000 to 100,000 while the molecular weight of the copolymers is in the range from 2,000 to 200,000 and preferably in the range from 50,000 to 120,000, based on free acid. A particularly preferred acrylic acid/maleic acid copolymer has a molecular weight of 50,000 to 100,000. Suitable, but less preferred compounds of this class are copolymers of acrylic acid or methacrylic acid with vinyl ethers, such as vinyl methyl ether, in which the acid makes up at least 50%. Other suitable builders are polyacetal carboxylic acids, for example of the type described in U.S. Pat. Nos. 4,144,226 and 4,146,495, and also polymeric acids which are obtained by polymerization of acrolein and subsequent disproportionation with alkalis and which are made up of acrylic acid units and vinyl alcohol units or acrolein units.

Suitable organic builders are, for example, polycarboxylic acids which are preferably used in the form of their sodium salts, such as citric acid and nitrilotriacetate (NTA), providing there are no ecological objections to their use.

In cases where a phosphate content can be tolerated, it is also possible to use phosphates, more particularly pentasodium triphosphate, and even pyrophosphates and orthophosphates which act primarily as precipitants for lime salts.

Suitable inorganic non-complexing salts are the bicarbonates, carbonates, borates or silicates of the alkali metals which are also known as "washing alkalis". Of the alkali metal silicates, sodium silicates with an $Na_2O$ to $SiO_2$ ratio of 1:1 to 1:3.5 are particularly suitable. From the remaining groups of typical detergent ingredients, components from the classes of redeposition inhibitors (soil suspending agents), neutral salts and fabric softeners are particularly suitable for use in the spray drying process according to the invention.

Suitable redeposition inhibitors are, for example, carboxymethyl cellulose, methyl cellulose, methyl hydroxyethyl cellulose and mixtures thereof. The above-mentioned sodium sulfate is cited as a typical example of a suitable representative of the neutral salts. Suitable softeners are, for example, swellable layer silicates of the montmorillonite type, for example bentonite.

As mentioned above, typical ingredients of detergents and cleaning products which are sensitive to high temperatures and/or liquid at room temperature, such as liquid nonionic surfactant components, bleaches based on per compounds, enzymes from the class of proteases, lipases and amylases or bacterial strains or fungi, stabilizers, fragrances, temperature-sensitive dyes and the like, are best mixed with the dry powders obtained beforehand.

Another example of embodiment of the invention is described in more detail in the following with reference to the accompanying drawings, wherein:

Figure 1:
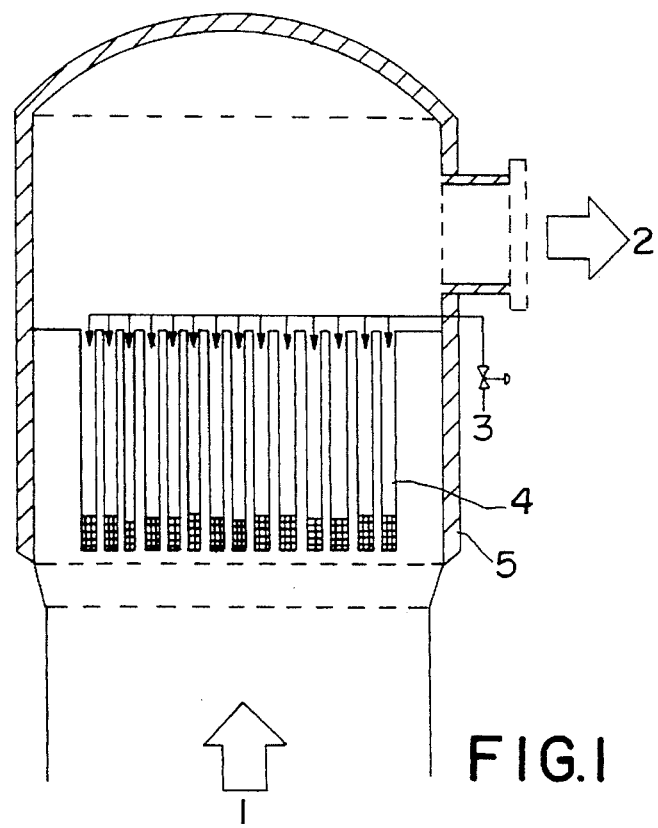
FIGS. 1 and 2 are longitudinal sections through the upper part of a tower-like spray dryer, only the most important elements having been schematically illustrated in the interests of clarity.

The dust-containing steam 1 flows upwards from the atomizing and drying zone into the head of the tower and, after passing through the filter elements 4, leaves it as clean steam 2.

The filter tubes 4 arranged in the head of the tower are drawn over wire supporting baskets. The dust adheres to the outer surface of the tubes and the clean steam flows through the filter medium 4 into the interior of the tubes and leaves the drying vessel through the clean gas zone 7 and the outlet. A steam pipe 3 operated under about 5 bar is provided for cleaning the filter tubes.

Figure 2:
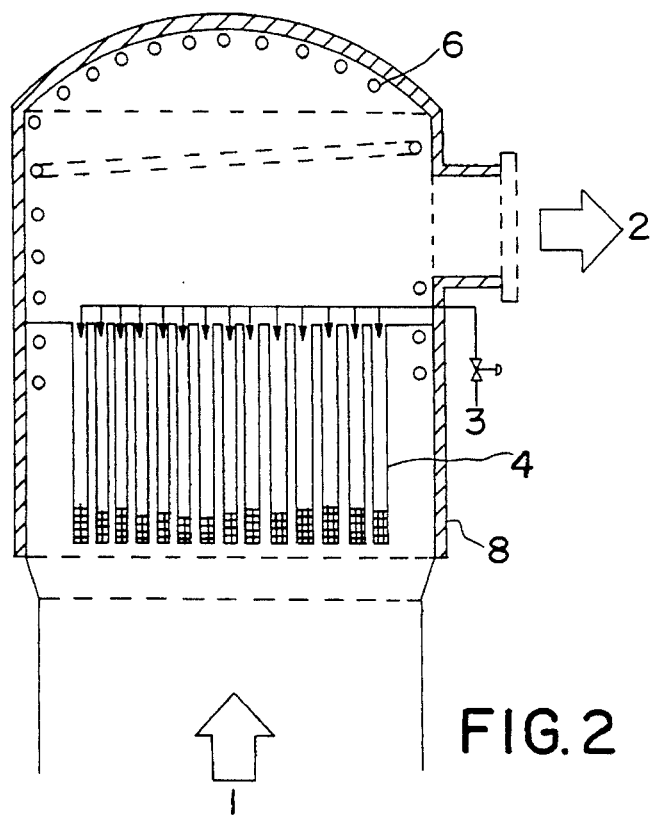

The head of the drying vessel is heatable so that no condensation occurs in the clean gas zone 7. For example, a double jacket 5 heatable with steam to around 140° C. may be provided around the head of the dryer (FIG. 1) and/or heating coils 6—again preferably heatable with steam—may be arranged in the head of the dryer (FIG. 2). FIG. 2 also shows a heat insulation 8 of the tower head. The tower head heating 5, 6 and the insulation 8 also extend over the filter zone or at least the upper part thereof to rule out condensation on the filter tubes and the inner tower walls in this zone.

List of Reference Numerals

1 Dust-containing steam
2 Clean steam
3 Steam for cleaning the filter tubes
4 Filter tubes
5 Double jacket
6 Tube coil for internal heating
7 Clean gas zone
8 Heat insulation

We claim:

1. A process for the production of pourable and free flowing granules for use as wetting agents, detergents or cleaning products comprising:

a) drying an aqueous solution or suspension of materials selected from the group consisting of wetting agents, detergents, cleaning products and mixtures thereof, in a drying vessel using a hot gas stream of superheated steam to form granules thereof, b) terminating step a) before said granules are damaged by heat, c) freeing said hot gas stream from entrained particles of said materials by means of filters, and d) exposing said filters to bursts of superheated steam to remove any particles of said materials from said filters.

2. The process as in claim 1 wherein step a) is conducted in a spray drying vessel.

3. The process as in claim 1 wherein step a) is conducted in a fluidized bed spray granulation vessel.

4. The process as in claim 1 carried out in a closed-loop system with a steam circuit from which water evaporated from said materials or mixture of materials is removed and the released thermal energy is returned to said closed-loop.

5. The process as in claim 1 wherein said filters are selected from the group consisting of tube filters, woven fabric filters, felt filters and needle felt filters.

6. The process as in claim 1 including ensuring the long-term pourability and free-flow properties of said granules by mixing said granules with components capable of binding residual quantities of water from said granules.

7. The process as in claim 1 including ensuring the long-term pourability and free-flow properties of said granules by further drying said granules at a lower temperature than employed in step a).

8. The process as in claim 1 including heating said filters.

9. The process as in claim 8 wherein said steam comprises superheated steam.

10. The process as in claim 1 wherein said filters are arranged in the upper portion of said drying vessel and said hot gas stream is circulated upwardly and countercurrently with respect to said materials or mixtures of materials being dried and through said filters.

11. The process as in claim 10 wherein said filters are vertically disposed above the spraying zone of said drying vessel.

* * * * *